Dec. 3, 1929.    J. L. M. ZIMMERMAN    1,737,629
FUSIBLE PROTECTIVE DEVICE FOR MOTOR BEARINGS
Original Filed Oct. 6, 1924

INVENTOR
JAMES L. M. ZIMMERMAN.
BY
ATTORNEY

Patented Dec. 3, 1929

1,737,629

UNITED STATES PATENT OFFICE

JAMES L. M. ZIMMERMAN, OF PHILADELPHIA, PENNSYLVANIA

FUSIBLE PROTECTIVE DEVICE FOR MOTOR BEARINGS

Application filed October 6, 1924, Serial No. 741,850. Renewed April 24, 1929.

My invention relates to the prevention of hot bearings, with more particular reference to electric motor bearings.

A purpose of my invention is to cut off the main source of supply energy from a motor thermostatically if one of its bearings becomes hot.

A further purpose is to provide means operative through an oil drain plug or other insert within a bearing, forming a part of the connections for maintaining a shaft in revolution and normally inoperative when the plug is removed.

A further purpose is to replace a usual drain plug of an oil reservoir within a bearing for a revolving shaft by a plug carrying a fuse element and to include the latter element in the main circuit supply circuit or in the electric circuit of an electromagnetic control of the shaft drive.

A further purpose is to provide a motor having a low voltage circuit breaker with a fuse element in the electric circuit of the breaker adapted to fuse and break the latter circuit to shut down the motor if a bearing becomes hot.

Further purposes will appear in the specification and in the claims.

My invention relates to the art disclosed or methods involved as well as to the specific structure.

In the drawings I have preferred to illustrate only one of the many different forms of the thermostatic element and only two of many different ways of connecting it, selecting a form of element and ways of connecting it that are convenient and practical and which well illustrate the principles involved.

Figure 4:
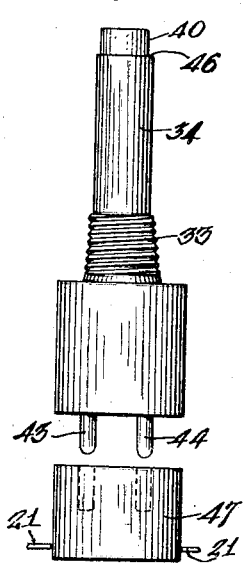

Figure 4 to enlarged scale is a side elevation of the plug element complete and a socket connecting with it.

Figure 5:
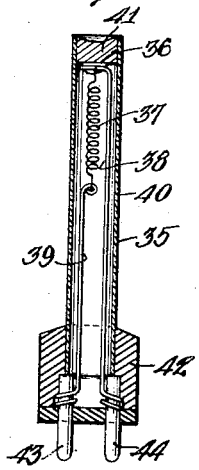
Figure 6:
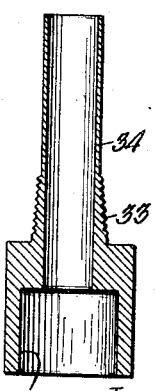
Figure 7:
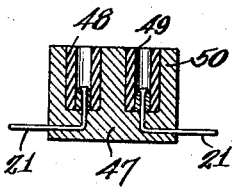

Figures 5, 6 and 7 are sectional elevations of different parts of the structure of Figure 4.

Similar numerals indicate like parts in all figures.

Describing in illustration and not in limitation and referring to the drawings,—

While my invention is broadly applicable to widely different types of shafts and bearings not here illustrated it was originally evolved for use with electric motors, and I have illustrated it applied to electric motors in the drawings.

Its application is particularly easy and inexpensive with electric motors already using low voltage circuit breakers, by extending the electric circuit of the breaker to include my thermostatic elements within the bearings. It is also particularly easy and inexpensive of application to small motors, both direct current and alternating.

I have considered it sufficient to illustrate the invention in application to these types, believing this sufficient to clearly show the principles involved in its application to other types of motors and of bearings.

Figure 1:
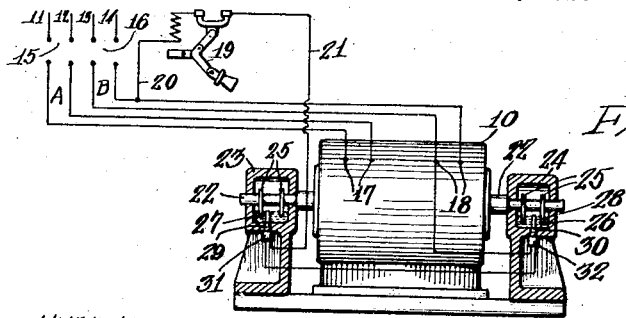
Figure 1 is a diagrammatic elevation in part section of my invention applied to a two-phase motor having a low voltage circuit breaker.

In Figure 1, the two-phase motor 10 has source of A-phase current over wires 11 and 12, and B-phase source over the wires 13 and 14. The corresponding switch terminals are shown at 15 and 16 and the motor terminals at 17 and 18. The usual low voltage circuit breaker 19 is shown connected in shunt across one of the phases (shown across the B-phase) but with a change in the connection to embody my invention. It is connected by means of wires 20 and 21. If a single phase current only were used it could as easily be connected in shunt with it.

The motor shaft 22 turns in the bearings 23 and 24, and the shaft is kept continuously lubricated at the bearings by means of oil rings 25 which dip into oil 26 within the oil reservoirs 27 and 28. At 29 and 30, in the motors as now ordinarily built, tapped holes are provided for periodically draining the oil reservoir. These holes are normally kept closed by means of screw drain plugs, which have hitherto been ordinary standard pipe plugs.

I replace the usual drain plugs by plug and fuse circuit-breaker members 31 and 32, illustrated in enlarged detail in Figures 4, 5, 6 and 7 and connect them in circuit in series with the low voltage breaker 19. It is of course not essential that these members 31 and 32 replace the usual drain plugs as separate openings can be used, but the drain openings provide convenient locations ready at hand. The plugs are provided with intermediate threaded tapered shoulders 33 to fit the usual tapped holes 29 and 30.

The tubular shank 34 upwardly extending from the end of the thread portion 33 enters the oil space. It is convenient to make the thermostatic circuit breaker separate from the plug and shank and to enclose the circuit breaker within the shank for mechanical reasons but this is not essential as the shank could be the tube of the circuit breaker element 35. The exact construction of this circuit breaker is obviously subject to wide variation. In the illustration a low temperature fuse material 36 anchors the upper end of a tension spring 37 to the upper end of a support or bracket in the form of a conducting rod or stiff wire 38, while the lower end of the spring is fastened in the upper end of a shorter (tensioned) conducting rod or stiff wire 39. A tube 40, desirably of glass and plugged at its upper end (at 41) encloses the members 36 to 39 and at its lower end is sealed into an insulating head 42. Terminals 43 and 44 are anchored in the head 42 and connect with and carry the stiff conducting members 38 and 39.

The bottom of the tubular plug portion is recessed or counterbored at 45 to receive the head 42. The glass tube 40 fits within the head and preferably extends somewhat through the shank 34. It is desirable to seal the upper end of the tubular shank around the glass tube, as with rubber cement at 46, though any connection between the two will do which prevents leakage of oil and, where this leakage is not a danger, the connection need merely hold the circuit breaker element in.

A socket member 47, to mate with the terminals 43 and 44, carries corresponding tubular terminals 48 and 49 embedded in insulating material 50 and electrically connected to wires 21. The terminals 48 and 49 frictionally fit the projecting ends of the terminals 43 and 44.

It will be noted that, with normal fastening of the thermostatic element within the shank, unscrewing of the plug to withdraw the parts will necessitate preliminary disconnection of the socket, so that the electric circuit will be interrupted when and while the plug is withdrawn.

When the plugs are screwed to place within the oil reservoirs, the upper ends of the fuse elements 31 and 32 preferably extend somewhat above the surface of the oil, bringing the fuse material as near as conveniently may be to the shaft in order to bring it to a position for quickest responsiveness to rise in shaft temperature.

Figure 2:
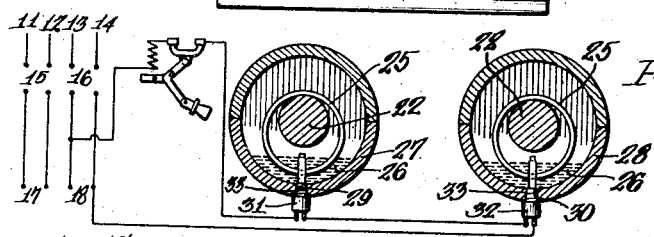
Figure 2 is a diagrammatic view, in part to enlarged scale, to more clearly illustrate the connections of Figure 1.

The arrangement illustrated in Figures 1 and 2 is particularly desirable with fairly large synchronous motors. Only a small fraction of the current passes through the low voltage circuit breaker and therefore through the thermostatic plugs within the oil reservoirs, so that these fuse elements are relatively small, having to carry a relatively small current only. The motor circuit is maintained closed as usual by the electromagnet of the breaker overbalancing a gravity or other opening pull. The circuit therefore opens automatically if the current through the breaker fail, as by reason of interruption at one or other of the fuse elements, or if the current through the circuit of the breaker fall to any predetermined value corresponding to the undervoltage at which it is desired to operate.

The details of the underload circuit breaker being in themselves no part of the present invention I have shown the breaker conventionally.

Figure 3:
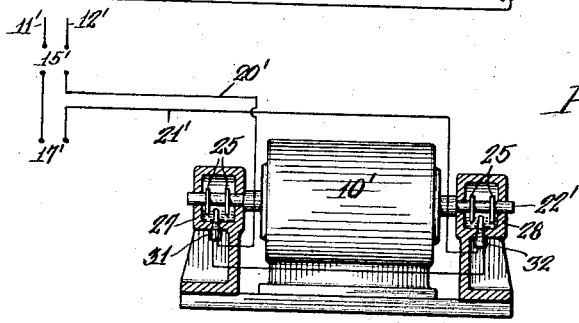
Figure 3 is a view similar to Figure 1 showing the invention applied to a small motor that may be taken as either direct current or single-phase alternating.

In the arrangement of Figure 3, the low voltage circuit breaker is dispensed with, the fuse elements within the bearings being included in series with the main circuit of the motor, interruption of either of these elements thus opening the main circuit and shutting down the motor. This arrangement is particularly advantageous with small motors, either direct current or alternating.

A particularly advantageous feature of the invention lies in mounting the fuse elements on the drain plugs which protects against starting the motor while either or both of the reservoirs are drained from oil.

With a separate source of current for an electromagnet normally pulled to inoperative position, the same thermostatic interruption of circuit through the electromagnet may be applied to shutting off the source of energy to other movers, whether they be regarded as prime movers or secondary movers, when the bearings overheat. For example, if the electromagnet open the valve of a steam engine or of a gas or gasoline engine or close an ignition circuit for the latter, thermostatic opening of the electromagnet will result in the gravity, spring or other pull which the electromagnet has overcome closing the valve or opening the circuit to stop the engine.

In view of my invention and disclosure, variations and modifications to meet individual whim or particular need will doubtless become evident to others skilled in the art and I claim all such in so far as they fall

Having thus described my invention, what I claim as new and desire to secure by Letters Patent is:—

1. The method of protecting the bearing of a driven shaft from overheating which consists in electromagnetically maintaining the continuity of supply of energy to the device driving the shaft and thermostatically interrupting the circuit including the electromagnet when the bearing becomes hot.

2. The method of protecting a rotating shaft and its bearing from overheating which consists in providing a pull tending to discontinue rotative effort, in electromagnetically overbalancing the pull to maintain the rotative effort, and in thermostatically opening the circuit of the electromagnet by reason of overheating of the bearing.

3. A revolving shaft, a bearing therefor, an oil reservoir within the bearing, an electric circuit-breaker controlling the rotation of the shaft and thermostatic means located at the bearing for opening the circuit-breaker circuit when the bearing becomes hot.

4. A shaft, a bearing therefor, a circuit interrupter thermostat within the bearing automatically separating with fusion, a source of energy, means for driving the shaft operated by the source of energy, an electromagnet controlling the application of the source of energy and an electric circuit including the interrupter when closed and the winding of the electromagnet to interrupt the source of rotative energy of the shaft by reason of operation of the interrupter.

5. A motor having a shaft and a bearing, a fusible plug within the bearing, an electromagnet controlling the operation of the motor, and an electric circuit energizing the magnet and including the fusible element of the plug automatically opened by fusion of the plug.

6. A motor having a shaft and spaced bearings, a thermostatic circuit interrupter in each bearing, an electromagnet controlling the operation of the motor, and an electric circuit energizing the magnet and including the interrupters.

7. An electric motor having a shaft and a bearing and a low voltage circuit breaker controlling its operation, a fusible plug in the bearing and an electric circuit energizing the circuit breaker to maintain the motor in operation, including the fusible element of the plug and opened by reason of fusion of the plug.

8. A shaft, a bearing therefor, an oil reservoir within the bearing, a drain plug carrying a fusible element within the reservoir, a control affecting operation of the shaft, an electromagnet operative to maintain the control to its duty, and an electric circuit energizing the magnet, including the fusible element of the plug and opened by reason of fusion of the plug.

9. A revolving shaft, a bearing therefor, an oil reservoir within the bearing, a threaded drain plug for the reservoir, and electric means so connecting with the plug as to require circuit interruption by turning of the plug to remove it, thereby cutting off rotative effort from the shaft.

10. A revolving shaft, a bearing therefor, an oil reservoir within the bearing, a drain plug for the reservoir, an energized circuit and mechanism controlled thereby adapted to maintain the shaft in revolution, a socket in the circuit and a circuit interrupter normally carried by the plug adapted to be engaged by the socket to include the interrupter within the circuit.

11. A revolving shaft, a motor driving the shaft, a circuit supplying the current to the motor and a thermostat in said circuit in effective heat transfer relation to the bearing normally maintaining the circuit and connections between the thermostat and the circuit disconnected when the thermostat is heated.

12. A revolving shaft, a motor driving the shaft, a circuit upon whose continuity the motor depends for its current supply and thermostatic interruption means heated by heating of the bearing of the motor adapted to then open the circuit.

13. An electric motor having bearings, current supply therefor, a low voltage circuit breaker controlling the current supply and having its electro-magnetic circuit in shunt with the current supply for the motor and a thermostat in circuit with said shunt in operative connection with one of the motor bearings and adapted to open the shunt with heating of the bearing.

14. A revolving shaft, having a bearing, an oil reservoir and a drain plug, a thermostatically-opened electric circuit breaker carried by the plug, an electric circuit including the circuit breaker and mechanism operated by the circuit for maintaining shaft-rotating effort, the electric circuit being so arranged that it must be opened for removal of the plug.

JAMES L. M. ZIMMERMAN.